Figure 1:
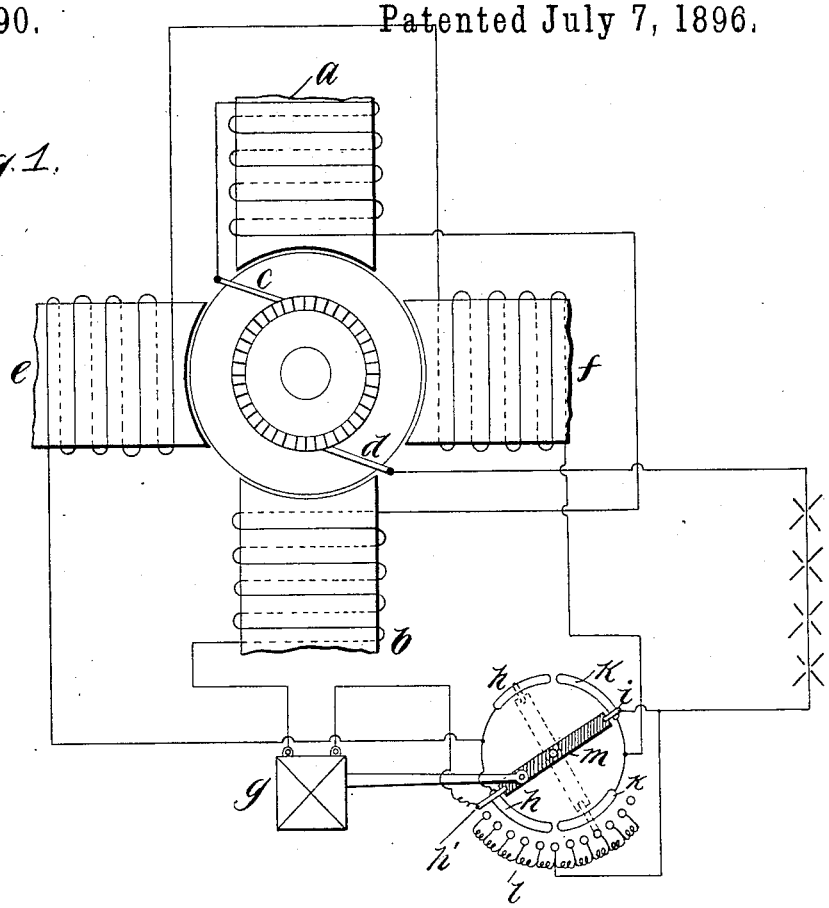

(No Model.)

F. H. LOVERIDGE.
METHOD OF AUTOMATIC CURRENT REGULATION OF DYNAMO ELECTRIC MACHINES.

No. 563,290.      Patented July 7, 1896.

Witnesses:
George L. Cragg
W. Clyde Jones

Inventor:
Frederick H. Loveridge
By Barton & Brown
Attorneys.

UNITED STATES PATENT OFFICE.

FREDERICK H. LOVERIDGE, OF COLDWATER, MICHIGAN, ASSIGNOR TO THE WESTERN ELECTRIC COMPANY, OF CHICAGO, ILLINOIS.

METHOD OF AUTOMATIC CURRENT-REGULATION OF DYNAMO-ELECTRIC MACHINES.

SPECIFICATION forming part of Letters Patent No. 563,290, dated July 7, 1896.

Application filed August 6, 1894. Serial No. 519,569. (No model.)

*To all whom it may concern:*

Be it known that I, FREDERICK H. LOVERIDGE, a citizen of the United States, residing at Coldwater, in the county of Branch and State of Michigan, have invented a certain new and useful Improvement in Methods of Automatic Current-Regulation of Dynamo-Electric Machines, (Case No. 2,) of which the following is a full, clear, concise, and exact description, reference being had to the accompanying drawings, forming a part of this specification.

My invention relates more particularly to dynamo-electric machines of the class usually spoken of as of the "constant-current type," which are used for supplying translating devices, as arc-lamps and motors placed in series.

My invention may be embodied in any of the well-known types of constant-current machines, as, for example, the series-wound, the shunt-wound, or the separately excited.

The prominent feature of my invention consists in maintaining a practically uniform current through the coils of one set of the field-magnet pole-pieces, while the current through the coils of the other set of field-magnet poles is varied automatically in response to variations in the external circuit, caused by changes in load or otherwise.

The dynamo-machine must be provided with at least two sets of field-magnet pole-pieces. The number of sets of such pole-pieces, however, may be more than two, provided they are arranged in proper relation to one another. That is to say, my invention contemplates two sets of field-magnet pole-pieces, each set consisting of any desired number, the coils of one set of pole-pieces being traversed by a practically uniform current, while provision is made for varying the current passing through the coils of the other set, preferably both as to strength and direction, in order that by such variation the excitation of the field may be regulated to produce in the armature the required amount of electromotive force to maintain the current in the exterior circuit at the desired value.

In the preferable form of my improved dynamo-machine, the different sets of pole-pieces are made symmetrical, that is, they are preferably of approximately the same size and winding and uniformly disposed in the field. Each set may consist of simply two pole-pieces, placed diametrically opposite. When the same current is passing through the coils of both sets in the same direction, the field will be excited to its maximum amount, as, for example, would be required when the machine was running under full load. Diverting current from the coils of the variable set of field pole-pieces will reduce the strength of the field and reversing such current and bringing it up approximately to the value of the current maintained through the coils of the constant field-magnet poles will still further reduce the strength of the field, so that the electromotive force produced by the armature will be very low, for example, only of the amount required when the machine is running on short circuit.

I contemplate placing the brushes under the constant field-poles; and, by setting them either manually or automatically within their range of movement under said poles, sparkless commutation and current-regulation may be effected. When provision is made for such adjustment of the brushes, it is not necessary to provide means for varying the strength or direction of the current through the coils of the other set of pole-pieces, though it may be desirable to make provision for such variation of the strength and direction of the current in connection with machines having their brushes adapted to be adjusted, as described.

The current in the different coils of the armature must be reversed twice during each revolution of the armature, these reversals taking place at the line of commutation.

The construction of my machine herein described is such that the definite fractional portion of the field, which is maintained at a uniform magnetic moment, will be in position to be intersected by the line of commutation.

My invention herein relates more particularly to the method of and means for varying the strength and direction of the current through one set of the coils of the field-magnet pole-pieces, a prominent and essential feature of my method consisting in varying the resistance of the exciting-coils of the portion of the field intermediate of the uniform portions of the field, said coils being included in series with the translating devices, and will be more readily understood by reference to the accompanying drawings, in which—

Figure 2:
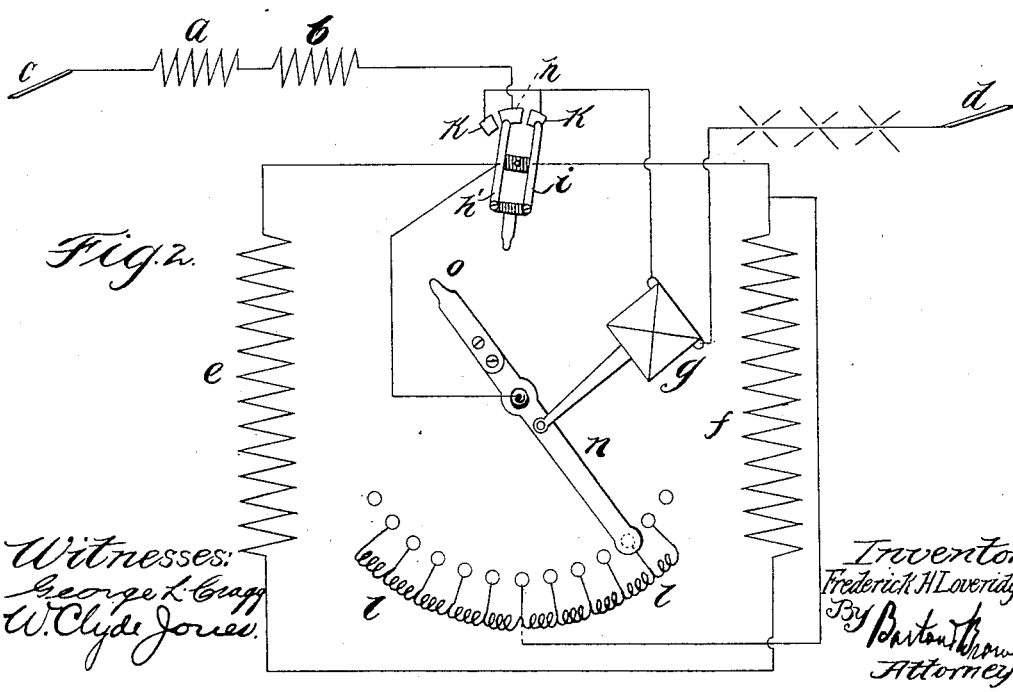

Figure 1 is a diagram illustrative of the circuits of a dyanmo-electric machine, together with the apparatus for automatically varying and reversing the current through the coils of one of the sets of field-magnet poles. Fig. 2 is a detailed view illustrative of the circuit through the coils of the variable set of field-magnet pole-pieces with a modified form of rheostat and commutator for varying the strength and direction of such current.

As illustrated in Fig. 1, the field-magnet poles $ab$, constituting one set, have their coils included in the main circuit. In this instance, the entire current traversing each of the coil of said magnets, and the current being maintained practically constant, the said set of field-poles will produce a practically constant field of force. The pair of brushes $c\,d$ are placed under these poles. The pole-pieces $e\,f$ are connected in a similar manner with their coils included in the main circuit of the machine. Regulation is accomplished by varying the strength of the current through the coils of the set of field-magnet poles $ef$.

The circuits, as shown in Fig. 1, may be traced from brush $c$ through the coil of magnet $a$, thence through the coil of magnet $b$ to the automatic regulator $g$, and thence to contact-piece $h'$, carried upon a pivoted arm and adapted to make contact with the lower contact-plates $h$ and $k$ and with the contacts of the rheostat $l$. The contacts $h\,h$ are connected with the field-coils $e$ and $f$, the circuit then extending to the contact-plates $k\,k$, with which the contact-piece $i$ is adapted to make contact, the contact-piece $i$ being connected with the lamp-circuit. The middle contact of the rheostat is connected with the lamp-circuit. Whenever the contact-piece $h'$ rests upon plate $h$ and one of the terminals of the rheostat $l$, two paths for the current are afforded, one through the field-coils $e$ and $f$ and the other through the resistance-coils of the rheostat $l$.

Any suitable automatic current-regulator $g$ may be employed for operating the commutator $m$ for the purpose of varying the strength and direction of the current through the coils of field-magnet poles $ef$ to vary their strength and the direction of their action in order that the electromotive force developed by the armature may be varied in accordance with the load, so that the current in the external circuit may be maintained at a practically constant value. The form of automatic current-regulator which I have employed is shown in Letters Patent No. 435,526, of September 2, 1890.

The commutator of the rheostat, as shown by full lines in Fig. 1, directs the entire current through the coils of magnets $e\,f$. The regulator $g$, being included in the circuit of the machine, operates, whenever the current through it is increased, to shift the commutator toward the position indicated by the dotted lines. This shifting is accomplished little by little and the current through the coils of magnets $e\,f$ will be gradually diverted more and more through the rheostat as the resistance of the shunt-circuit including the rheostat is diminished by the movement of the switch or commutator. When the rheostat-switch is moved a certain distance, in this instance to the center of the rheostat resistance, all the resistance of the rheostat will be cut out and the coils of magnets $e\,f$ will be short-circuited. Further movement of the rheostat-switch removes the short circuit from the coils of magnets $e\,f$ and current is set up through said coils of magnets $e\,f$ in the opposite direction. The movement of the switch being continued to the position indicated by the dotted lines, this current of opposite polarity will be increased, and further movement of the commutator-switch acting to remove more and more the rheostat-resistance from the shunt around said coils, increases the current thus set up in the coils of magnets $e\,f$ until, when all the rheostat-resistance is removed, we shall find the current passing, as before described, from brush $c$ through the coils of the field-pole magnets $ab$ and thence to the contact-piece $h'$, resting upon contact-plate $k$, current then passing through the coils $f$ and $e$ and to the contact-plate $h$ and to contact-piece $i$ in engagement therewith and through the working circuit to the opposite brush $d$.

I thus describe how, as lamps are removed from the circuit, one after another, the current is first diminished through the coils of the set of variable magnets, and finally reversed and afterward increased. In this manner, when all the lamps are removed, the variable magnets will be acting in a different direction from that in which they act when the machine is running under full load. The field of force is accordingly diminished in strength and finally made practically neutral in its effect upon the revolving armature. In this manner the electromotive force developed by the armature is regulated in accordance with the demands.

The rheostat and switch illustrated in Fig. 2 are designed to be operated by an automatic current-regulator $g$, though in this instance, as well as in the form of apparatus shown in Fig. 1, the switch and rheostat might be operated by hand.

In Fig. 2 the circuit may be considered as passing from brush $c$ in series through the set of magnets $a\,b$, and thence to contact-plate $h$, and thence, when the pivoted reversing-switch is in the position shown, to the contact-piece $h'$. The circuit from contact-piece $h'$ may be traced by one branch through the coils of the set of magnets $e\,f$, and thence to contact-piece *i* of the reversing-switch, and thence to contact-plate *k*, and thence through the automatic regulator *g*, and thence through the lamp-circuit and to the other brush *d*. Going back to contact-piece *h'* the shunt circuit or branch may be traced to the rheostat-arm *n*, and thence through the rheostat and thence to the contact-piece *i* of the reversing-switch. By means of the projecting end *o* of the rheostat-arm the reversing-switch is changed to bring contact-piece *i* into electrical connection with plate *h*, while contact-piece *h'* is brought into contact with plate *k*. In this position of the reversing-switch the current through the coils of magnets *e f* will be reversed, the current passing from contact-piece *i*, first through the coil of magnet *f*, then through the coil of magnet *e*, and thence to contact-plate *h'*, and thence to contact-plate *k*, and thence to the line. The derived circuit through the rheostat will be from contact-piece *i* to the rheostat *l*, and thence to the arm *n* of the rheostat, and thence to contact *h'* and contact-plate *k* to the exterior circuit.

It is evident that my invention admits of other modifications which would readily suggest themselves to those skilled in the art, and I therefore do not limit my claim to the details of construction shown.

Having thus described my invention, I claim as new and desire to secure by Letters Patent—

The method of varying the electromotive force developed by a dynamo-machine to maintain the volume of the current at a practically uniform value under changes of circuit-resistance, which consists in maintaining two portions of the field at a uniform magnetic moment, said portions being those intersected by the line of commutation, varying the resistance of that portion of the circuit comprising the coils of the portions of the field intermediate of the said uniform portions and reversing the polarity of the current traversing said coils, the variations in resistance and the direction of the current through said coils being effected automatically and in response to changes in the current traversing the external circuit.

In witness whereof I hereunto subscribe my name this 18th day of July, A. D. 1894.

FREDERICK H. LOVERIDGE.

Witnesses:
GEORGE P. BARTON,
GEORGE L. CRAGG.